United States Patent Office 3,238,275
Patented Mar. 1, 1966

3,238,275
POLYMERIZATION OF ACRYLONITRILE-STYRENE MIXTURES IN THE PRESENCE OF POLYBUTADIENE
William C. Calvert, Gary, Ind., assignor, by mesne assignments, to Borg-Warner Corporation, Chicago, Ill., a corporation of Illinois
No Drawing. Filed Sept. 30, 1953, Ser. No. 383,379
6 Claims. (Cl. 260—880)

The invention relates to resinous, hard, tough, polymeric products and the methods of making the same.

More particularly the invention relates to resinous, hard, tough, polymeric products obtained from polybutadiene, vinyl aromatic compounds, and vinyl cyanide compounds.

Heretofore commercially valuable, resinous, hard, tough products comprising butadiene, styrene and acrylonitrile have been prepared by first copolymerizing styrene and acrylonitrile to give a resinous copolymer and then mixing this copolymer with a minor proportion of a rubbery copolymer of butadiene and acrylonitrile. One such product is described in the Daly Patent 2,439,202 and is sold under the trade name of Royalite.

It has hitherto been considered necessary in producing this type of product that the resinous copolymer be mixed with a butadiene-acrylonitrile rubber in order to obtain satisfactory compatibility of the ingredients. The resinous copolymer and the rubbery copolymer must also be mixed at high temperatures and then worked on a cold mill. The two copolymers are always mixtures capable of mechanical separation.

An object of this invention is to provide a resinous, hard, tough product of similar nature to Royalite, having like hardness and toughness, with ease of fabrication into luggage, pipes, plates for automobiles and the like, but having the advantage of being a copolymeric homogeneous product not capable of mechanical separation.

Another object is to provide a method of making a resinous, hard, tough product similar to Royalite in properties, without using a butadiene-acrylonitrile rubber.

Another object is to provide a resinous, hard, tough product comprising butadiene, styrene and acrylonitrile by a simple, inexpensive process, avoiding the necessity of high temperature milling and/or cold mill work.

A further object is to provide a tough, resinous product having a Shore D hardness of between 70 to 80, with a butadiene content of 20% to 60% by weight.

Other objects and advantages of the invention will become apparent as the following description progresses.

In accordance with one embodiment of this invention, a polybutadiene emulsion is first prepared. To this emulsion is added monomers of acrylonitrile and styrene in a proportion of about 40% to 80% combined acrylonitrile and styrene by dry weight giving a polybutadiene content of 20% to 60% by weight. The acrylonitrile is preferably used in about 20% to 25% by weight but suitably may be as low as 10% with a consequent, but in some cases not objectionable, decrease in toughness of the resulting product. The styrene is present in about 30% to 70% by weight. The composition is then heated to a temperature substantially above 20° C., but below the decomposition temperature of the polymer, viz., 50° C. to 100° C., preferably in the presence of polymerization catalysts, whereupon the acrylonitrile, styrene and polybutadiene coact to form the resinous, hard, tough, polymeric product of this invention.

Particularly satisfactory results are obtained by carrying out the major portion of the polymerization and copolymerization reactions at between 40° C. and 85° C. At lower temperatures the product becomes more rubbery than is desirable for many purposes, and at higher temperatures the thermoplasticity decreases to an extent which is generally objectionable. The reaction is exothermic and the minor latter portion of the reaction can proceed at higher temperatures without making the product unsatisfactory. However, for uniformity it is desirable to carry out substantially all of the reaction at between 40° C. to 85° C.

In one embodiment of the invention a soluble type product is produced, which, among other advantages, such as compatibility with other ingredients, can be solvent welded, using solvents such as acetone, methyl ethyl ketone, ethylene dichloride, ethyl acetate and the like. In making this product the mixture of vinyl aromatic monomer and acrylonitrile monomer are added continuously over a period of several minutes or in a plurality of small portions to the butadiene polymer instead of being added all at once. In this way there is only a small amount of monomer (not more than, for example, 10% on the polymer) present with the butadiene polymer before the reactions between the monomers, and monomers and polymer are mostly or substantially completed. Furthermore, this allows better temperature control, and it has been found particularly desirable for this product to maintain the temperature of the reaction between 40° C. to 85° C., and preferably between 50° C.–75° C. Suitably the monomer mixture may be added not more than one third its total at a time until the full amount required has been added, with, if necessary, a wait of several seconds or minutes between additions to more readily maintain constant temperature conditions. Preferably, the monomer mixture is added substantially continuously and slowly over a period of several minutes, viz., ten or more, until most of the reaction has taken place.

In place of acrylonitrile other vinyl cyanide type compounds may be used such as methacrylonitrile. Likewise the styrene may be replaced by alkyl vinyl benzenes having the alkyl substituted either in the ring or side chain such as vinyl toluene, alpha-methyl styrene, alpha-methyl para-methyl styrene, and the like. Other ingredients may be added such as, for example, minor proportions of butadiene monomer may be added with the monomers of styrene and acrylonitrile.

The following examples are given to illustrate the invention:

EXAMPLE 1

In the following preparations the polybutadiene content was constant at 30% by weight, while the acrylonitrile content was varied from 0 to 30%, with the styrene content ranging from 40% to 70%.

*Polymerization recipe*

| | Parts by weight |
|---|---|
| 55% polybutadiene latex | 54.4 |
| Acrylonitrile | 0–30 |
| Styrene | 70–40 |
| Cumene hydroperoxide | .75 |
| Dresinate 731[1] | 2.8 |
| Sodium pyrophosphate | .5 |
| Sodium hydroxide | .15 |
| Darvan #1[2] | .125 |
| Dextrose | 1.0 |
| Ferrous sulfate | .05 |
| Water | 175.5 |

[1] Sodium salt of a hydrogenated disportionated rosin.
[2] Sodium salt of a polymerized alkylaryl sulfonic acid.

The ingredients were charged into a glass reactor and heated with agitation in a water bath maintained at 75° C. After 3½ hrs. the resulting latex was cooled, stabilized by the addition of 2% of di-tertiary butyl para-cresol, and then coagulated with dilute brine and sulfuric acid. By heating to 95° C. the powdery copolymer became somewhat granular so that filtration and washing were facilitated. After drying to constant weight at 100° C. the product was formed into a sheet by milling on a laboratory mill. Molded sheets were tested and the following results obtained.

butadiene was substantially polymerized as evidenced by lack of odor and pressure as the reactor was opened.

A further addition of the following materials was made, the reactor resealed and the heating continued for 3 more hrs. at 50° C.

| | Parts by weight |
|---|---|
| Styrene | 50 |
| Acrylonitrile | 20 |
| Cumene hydroperoxide | .38 |

The resulting latex was stabilized with an emulsion containing 1 gm. of di-tertiary butyl para-cresol and then

| Sample | Percent polybutadiene | Percent acrylonitrile | Percent styrene | Percent tensile strength (p.s.i.) | Percent elongation | Percent set | Percent bursting strength[1] | Softening point, °C. | Shore D hardness | Brittle point, °C. | Impact resistance[2] |
|---|---|---|---|---|---|---|---|---|---|---|---|
| A | 30 | 0 | 70 | 2,929 | 0 | 0 | 85 | 88.5 | 68 | −57.5 | Poor. |
| B | 30 | 5 | 65 | 3,543 | 5 | 0 | 308 | 88.5 | 70 | −55 | Fair. |
| C | 30 | 10 | 60 | 4,829 | 20 | 20 | 380 | 92.5 | 72 | −60 | Good. |
| D | 30 | 15 | 55 | 4,920 | 45 | 33 | 412 | 95 | 72 | −62.5 | Excellent. |
| E | 30 | 20 | 50 | 5,035 | 85 | 60 | NB470 | 96 | 75 | −62.5 | Do. |
| F | 30 | 25 | 45 | 4,938 | 120 | 93 | NB515 | 97.5 | 76.5 | −62.5 | Do. |
| G | 30 | 30 | 40 | 4,545 | 105 | 87 | 483 | 97 | 75 | −45 | Do. |

[1] As determined on a Mullen paper tester.
[2] As determined by sharply striking an ⅛ inch thick sheet against the corner of a stone slab.
NB—sample did not rupture during test.

Samples C–G were transparent in thin sections and translucent in thick sections. Molded sheets could be readily formed into various shapes by the usual methods such as line bending, manual stretch, plug and ring, blow, vacuum, ridge, and combination forming. The products were tough and rigid and possessed a good surface hardness; they could be colored or pigmented and could be readily embossed by roll or plate embossing.

EXAMPLE 2

The effect of varying the polybutadiene content is shown in the following series. The acrylonitrile and styrene ratio was maintained at approximately 1:1.8 throughout and the polymerization recipe and reaction conditions were the same as noted in Example 1.

Physical test results on the products were as follows:

coagulated by pouring into a dilute solution of sulfuric acid. The slurry was heated to boiling and then filtered; the white granular product was finally washed, dried, and formed into sheets by milling and molding.

The latter were transparent, tough and light amber in color. Physical properties were as follows:

| | |
|---|---|
| Tensile strength (p.s.i.) | 2156 |
| Percent elongation | 158 |
| Percent set | 93 |
| Bursting strength (Mullen) | 280 |
| Softening point °C. | 67 |
| Shore D hardness | 52 |
| Brittle point °C. | −73.5 |
| Impact resistance | Excellent |

| Sample | Percent polybutadiene | Percent acrylonitrile | Percent styrene | Percent tensile strength (p.s.i.) | Percent elongation | Percent set | Percent bursting strength | Softening point, °C. | Shore D hardness | Brittle point, °C. | Impact resistance |
|---|---|---|---|---|---|---|---|---|---|---|---|
| H | 20 | 29 | 51 | 5,982 | 22 | 17 | 588 | 94.5 | 80 | 25 | Good. |
| F | 30 | 25 | 45 | 4,938 | 120 | 93 | NB515 | 97.5 | 76.5 | −62.5 | Excellent. |
| I | 40 | 22 | 38 | 3,892 | 135 | 105 | NB370 | 90 | 70 | −70 | Do. |
| J | 50 | 18 | 32 | 3,585 | 173 | 118 | NB270 | 86 | 65 | −73.5 | Do. |
| K | 60 | 15 | 25 | 2,677 | 193 | 115 | NB212 | 79.5 | 57 | −73.5 | Do. |

Translucency and flexibility increased with increasing polybutadiene content. Samples J and K could be bent double without whitening.

EXAMPLE 3

In the following preparation the polybutadiene was formed in the same reaction vessel used for the final polymerization. The following materials were charged into a glass pressure reactor:

| | Parts by weight |
|---|---|
| Butadiene | 175 |
| Cumene hydroperoxide | .3 |
| Sodium pyrophosphate | 2.5 |
| Sodium oleate | 4.0 |
| Dextrose | 1.0 |
| Ferrous sulfate | .05 |
| Water | 200 |

The vessel was rotated in a water bath for 17 hrs. at 30° C. and then for 1½ hrs. at 50° C. At this point the

EXAMPLE 4

In the following series alpha-methyl styrene was substituted for styrene with a resulting substantial increase in softening point of the product. Other properties were not materially altered.

| Formulas | Parts by weight | | | |
|---|---|---|---|---|
| | L | M | N | O |
| 55% polybutadiene latex | 36.36 | 54.54 | 72.72 | 90.9 |
| Alpha-methyl styrene | 51.0 | 45.0 | 38.0 | 32.0 |
| Acrylonitrile | 29.0 | 25.0 | 22.0 | 18.0 |
| Cumene hydroperoxide | .75 | .65 | .55 | .45 |
| Dresinate 731 | 3.2 | 2.8 | 2.4 | 2.0 |
| Sodium pyrophsfhate | .5 | .5 | .5 | .5 |
| Sodium hydroxide | .146 | .146 | .146 | .146 |
| Darvan #1 | .125 | .125 | .125 | .125 |
| Dextrose | 1.0 | 1.0 | 1.0 | 1.0 |
| Ferrous sulfate | .05 | .05 | .05 | .05 |
| Water | 183.5 | 175.4 | 167.0 | 159.0 |

Polymerization was effected in 6 hrs. at 50° C. using a rotating glass reactor. The latices were stabilized by the addition of 1.2% of di-tertiary butyl para-cresol and coagulated in dilute sulfuric acid. The resulting products were filtered off, washed and dried to constant weight, and finally milled and molded into sheets for testing. Translucency increased and surface hardness decreased with increasing polybutadiene content. Other physical properties were as follows:

|  | L | M | N | O |
|---|---|---|---|---|
| Tensile strength (p.s.i.) | 5,993 | 4,417 | 3,904 | 3,476 |
| Percent elongation | 28 | 112 | 147 | 170 |
| Percent set | 18 | 93 | 115 | 115 |
| Bursting strength (Mullen) | NB465 | NB465 | NB375 | NB270 |
| Softening point, °C | 112.5 | 110.5 | 106 | 99.5 |
| Shore D hardness | 80 | 75 | 70 | 61 |
| Brittle point, °C | −12 | −65 | −70 | −73.5 |
| Impact resistance | (¹) | (¹) | (¹) | (¹) |

¹ Excellent.

It will be noted that the softening point in all cases is considerably higher than the corresponding product containing styrene.

EXAMPLE 5

In the following products a lower softening point was obtained by the addition of butadiene prior to polymerization.

| Formulas | Parts by weight | |
|---|---|---|
|  | P | Q |
| 55% polybutadiene latex | 54.54 | 36.36 |
| Butadiene | 2.5 | 10.0 |
| Styrene | 42.5 | 45.0 |
| Acrylonitrile | 25.0 | 25.0 |
| Cumene hydroperoxide | .75 | .75 |
| Dresinate | 2.8 | 3.25 |
| Sodium pyrophosphate | .5 | .5 |
| Sodium hydroxide | .15 | .15 |
| Darvan #1 | .125 | .125 |
| Dextrose | 1.0 | 1.0 |
| Ferrous sulfate | .05 | .05 |
| Water | 175.5 | 183.5 |

Reaction P was complete in 1¼ hours at 75° C. whereas reaction Q was heated for 3½ hours at 75° C. Both products were worked up in the manner described in previous examples. Test results were as follows:

|  | P | Q |
|---|---|---|
| Tensile strength (p.s.i.) | 4,865 | 5,308 |
| Percent elongation | 140 | 63 |
| Percent set | 110 | 50 |
| Bursting strength (Mullen) | NB468 | 452 |
| Softening point, °C | 88 | 64 |
| Shore D hardness | 75 | 75 |
| Brittle point, °C | −62.5 | −40 |
| Impact resistance | Excellent | Excellent |

As the above data indicate, the addition of butadiene is effective in reducing the softening point of the polymer but does not change the other properties to any great extent.

EXAMPLE 6

In the following preparation, latices based on styrene and butadiene copolymers were used in place of polybutadiene.

| Formulas | Parts by weight | | | |
|---|---|---|---|---|
|  | R | S | T | U |
| 47.5% 30-70 styrene butadiene copolymer latex | 84.2 | | | 63.2 |
| 41.7% 50-50 styrene butadiene copolymer latex | | 119.6 | 95.7 | |
| Styrene | 38.0 | 32.0 | 38.0 | 45.0 |
| Acrylonitrile | 22.0 | 18.0 | 22.0 | 25.0 |
| Cumene hydroperoxide | .75 | .75 | .75 | .75 |
| Dresinate 731 | 2.4 | 2.0 | 2.4 | 2.8 |
| Sodium pyrophosphate | .5 | .5 | .5 | .5 |
| Darvan #1 | .125 | .125 | .125 | .125 |
| Dextrose | 1.0 | 1.0 | 1.0 | 1.0 |
| Ferrous sulfate | .05 | .05 | .05 | .05 |
| Water | 155.5 | 130.5 | 143.5 | 166.8 |

Polymerization was effected in 1¾ hrs. at 75° C. and the resulting latex was stabilized by the addition of 1% di-tertiary butyl para-cresol and ½% of Agerite Stalite (heptylated diphenylamine). The product was separated by coagulation with dilute salt and acid, filtering, washing and drying. Sheets were formed by milling and molding at 320° F.

The S and T copolymers were transparent, light amber in color, and tough. The R and U products were similar except that they were translucent rather than transparent. Physical test results were as follows:

|  | R | S | T | U |
|---|---|---|---|---|
| Tensile strength | 4,594 | 3,936 | 4,023 | 4,970 |
| Percent elongation | 142 | 193 | 158 | 92 |
| Percent set | 110 | 145 | 128 | 67 |
| Bursting strength | 400 | NB325 | 438 | 478 |
| Softening point, °C | 93.5 | 85 | 92.5 | 76 |
| Shore D hardness | 71 | 69 | 74 | 76 |
| Brittle point, °C | −25 | −5 | 0 | −30 |
| Impact resistance | (¹) | (¹) | (¹) | (¹) |

¹ Excellent.

The effect of substituting a styrene butadiene copolymer for polybutadiene is principally to raise the brittle temperature and the effect becomes more pronounced as the proportion of styrene in the rubbery copolymer is increased.

EXAMPLE 7.—SOLUBLE TYPE PRODUCT

In the following process a substantially constant temperature was maintained throughout the polymerization by adding the monomer-catalyst mixture at such a rate that the heat of reaction was balanced by the heat loss of the reactor.

These materials were weighed into a 3-neck flask fitted with a reflux condenser, dropping funnel and thermometer:

|  | Gm. |
|---|---|
| 55% polybutadiene latex | 218.0 |
| Dresinate 731 | 16.0 |
| Sodium pyrophosphate | 2.0 |
| Sodium hydroxide | .6 |
| Daxad * | .5 |
| Dextrose | 4.0 |
| Water | 602.0 |

*Similar to Darvan #1. See note under Example 1.

The flask and contents were heated to 65° C. by means of a water bath and then the following added:

|  | Gm. |
|---|---|
| Ferrous sulfate | .05 |
| Water | 100.0 |

The water bath temperature was adjusted to 60° C. and then the following added through the dropping funnel at such a rate that the temperature of the reaction was maintained close to 65° C.

| | Gm. |
|---|---|
| Styrene | 180.0 |
| Acrylonitrile | 100.0 |
| Cumene hydroperoxide | 3.0 |

The addition required 48 minutes, the bath temperature being maintained at 60° C. by the addition of cold water from time to time. To complete the polymerization the bath temperature was then increased to 70° C. for an additional 48 minutes at which time a steam distillation test on a sample of the latex showed almost complete absence of monomer.

The latex was stabilized by stirring in an emulsion of 4 gm. of Ionol and 2 gm. of Agerite Stalite, and then coagulated with dilute salt and acid. After dewatering and drying the product was milled on a rubber mill and finally molded into test sheets which had the following properties:

| | |
|---|---|
| Tensile strength (p.s.i.) | 4691 |
| Percent elongation | 190 |
| Percent set | 155 |
| Bursting strength (Mullen) | 468 |
| Softening point (° C.) | 97 |
| Shore D hardness | 74 |
| Brittle point (° C) | −65 |
| Impact resistance | Excellent |

The product was further characterized by a high extrusion rate and excellent milling, calendering, molding and drawing properties.

The products of the foregoing examples can be modified to give harder and non-thermoplastic products by adding curing agents such as sulfur or heat reactive phenolic resins and the like to the final latex prior to coagulation. Preferably the milling step is omitted, or care is taken that the temperature and time of milling is low in order to prevent reaction on the mill, and then the curing is carried out during the molding. The time and temperature for curing with sulfur and phenolic resin can be that normally used for curing such materials with rubber. However, as an example, satisfactory results are obtained by incorporating 2 to 3% of sulfur in the latex on the basis of the total solids with 1% by weight of an accelerator such as tetramethyl thiuram disulphide, captex or the like, and 5% of zinc oxide. The latex containing this composition is coagulated and molded under heat of 320° F. for about 15 minutes. This results in a good cure which is a reaction of the sulfur with residual unreacted groups of the polymerized butadiene styrene and acrylonitrile. In place of the sulfur similar results, but with increased hardness, is obtained by incorporating 10% to 30% by weight of a heat reactive phenolic resin, such as a partially cured phenol formaldehyde resin in the latex, and then coagulating, molding and curing as with the sulfur.

While I have described certain preferred embodiments of my invention, many modifications may be made in the same without departing from the spirit of the invention; and I do not wish to be limited to the detailed examples, formulas and proportions of ingredients herein set forth, but desire to avail myself of all changes within the scope of the appended claims.

What I claim as new and desire to secure by Letters Patent is:

1. A process for the production of synthetic resins having excellent low temperature impact resistance comprising polymerizing at a temperature in the approximate range 40° C. to 85° C., from about 40 to about 80 parts by weight of a mixture of styrene and acrylonitrile in the presence of from about 60 to about 20 parts by weight of a synthetic rubber comprising substantially polybutadiene homopolymer present in the form of an aqueous polybutadiene latex.

2. The method of preparing a rubber-and-resin product which comprises polymerizing in a latex of a synthetic rubber containing not less than 95% of polymerized butadiene-1,3 and not more than 5% of styrene copolymerized therewith, a mixture of styrene and acrylonitrile, the styrene content of said mixture being 25% to 90% of styrene and the acrylonitrile content being correspondingly 75% to 10%, maintaining the amount of dispersing agent in the latex at not more than 5 parts per 100 parts of synthetic rubber and polymerized styrene-acrylonitrile contained therein until at least one-half of the styrene and acrylonitrile monomer mixture to be polymerized in admixture with the synthetic rubber has been converted to polymer, the amount of said resin being polymerized in the rubber latex being in the range from one-third to four parts of resin per part of synthetic rubber, and separating the thus formed rubber-resin product from the aqueous medium, said dispersing agent being alkali-metal soap.

3. The method of preparing a rubber-and-resin product which comprises polymerizing in a polybutadiene-1,3 homopolymer synthetic rubber latex, a mixture of styrene and acrylonitrile, the styrene content of said mixture being 25% to 90% of styrene and the acrylonitrile content being correspondingly 75% to 10%, maintaining the amount of dispersing agent in the latex at not more than 5 parts per 100 parts of synthetic rubber and polymerized styrene-acrylonitrile contained therein until at least one-half of the styrene and acrylonitrile monomer mixture to be polymerized in admixture with the synthetic rubber has been converted to polymer, the amount of said resin being polymerized in the rubber latex being in the range from one-third to four parts of resin per part of synthetic rubber, and separating the thus formed rubber resin product from the aqueous medium, said dispersing agent being alkali-metal soap.

4. The method of preparing a rubber-and-resin product having an impact strength at −40° C. of over 1 foot-pound per inch of Izod notch which comprises polymerizing in a latex of a synthetic rubber containing not less than 95% of polymerized butadiene-1,3 and not more than 5% of styrene copolymerized therewith, a mixture of styrene and acrylonitrile, the styrene content of said mixture being 25% to 90% of styrene and the acrylonitrile content being correspondingly 75% to 10%, maintaining the amount of dispersing agent in the latex at not more than 5 parts per 100 parts of synthetic rubber and polymerized styrene-acrylonitrile contained therein until at least one-half of the styrene and acrylonitrile monomer mixture to be polymerized in admixture with the synthetic rubber has been converted to polymer, the amount of said resin being polymerized in the rubber latex being in the range from one-third to four parts of resin per part of synthetic rubber, and separating the thus formed rubber-resin product from the aqueous medium, said dispersing agent being alkali-metal soap.

5. The method of preparing a rubber-and-resin product having an impact strength at −40° C. of over 1 foot-pound per inch of Izod notch which comprises polymerizing in a polybutadiene-1,3 homopolymer synthetic rubber latex, a mixture of styrene and acrylonitrile, the styrene content of said mixture being 25% to 50% of styrene and the acrylonitrile content being correspondingly 75% to 10%, maintaining the amount of dispersing agent in the latex at not more than 5 parts per 100 parts of synthetic rubber and polymerized styrene-acrylonitrile contained therein until at least one-half of the styrene and acrylonitrile monomer mixture to be polymerized in admixture with the synthetic rubber has been converted to polymer, the amount of said resin being polymerized in the rubber latex being in the range from one-third to four parts of resin per part of synthetic rubber, and separating the thus formed rubber resin product from the aqueous medium, said dispersing agent being alkali-metal soap.

6. The method of preparing a rubber-and-resin product having excellent low temperature impact resistance which comprises polymerizing in a synthetic rubber latex comprising substantially a polybutadiene-1,3 homopolymer, a mixture of styrene and acrylonitrile the styrene content of said mixture being from about 25% to about 90% and the acrylonitrile content being correspondingly from about 75% to about 10%, maintaining an amount of dispersing agent in the latex at not more than 5 parts per 100 parts of synthetic rubber and polymerized styrene-acrylonitrile contained therein until at least one-half of the styrene and acrylonitrile monomer mixture being polymerized in admixture with the synthetic rubber has been converted to polymer, and separating the thus formed rubber-resin product from the aqueous medium, said dispersing agent being alkali-metal soap.

References Cited by the Examiner

UNITED STATES PATENTS

| | | | |
|---|---|---|---|
| 2,123,599 | 7/1938 | Fikentscher et al. | 260—89.5 X |
| 2,422,550 | 6/1947 | Jacobson | 260—4 |
| 2,614,089 | 10/1952 | Harrison | 260—880 |
| 2,666,025 | 1/1954 | Nozaki | 260—880 |
| 2,820,773 | 1/1958 | Childers et al. | 260—880 |
| 3,168,593 | 2/1965 | Fremon et al. | 260—880 |

FOREIGN PATENTS

| | | |
|---|---|---|
| 589,802 | 7/1947 | Great Britain. |
| 649,166 | 1/1951 | Great Britain. |

MURRAY TILLMAN, *Primary Examiner.*

AARON SCHWARTZ, WILLIAM BENGEL, DAN ARNOLD, LESLIE H. GASTON, *Examiners.*

D. E. PELHAM, L. J. BERCOVITZ, G. F. LESMES, *Assistant Examiners.*